SANTOKH S. LABANA
INVENTOR

BY John R. Faulkner
Olin B. Johnson
ATTORNEYS

United States Patent Office 3,586,528
Patented June 22, 1971

3,586,528
DIVINYL-RESIN PAINTS AND PAINTING PROCESS
Santokh S. Labana, Dearborn Heights, Mich., assignor to Ford Motor Company, Dearborn, Mich.
Filed Aug. 4, 1969, Ser. No. 847,592
Int. Cl. B44d 1/50; C08f 1/24; C07c 69/52
U.S. Cl. 117—93.31
32 Claims

ABSTRACT OF THE DISCLOSURE

A substrate is coated with a film-forming composition consisting essentially of a unique divinyl compound and an alpha-beta olefinically unsaturated paint binder resin having a molecular weight in excess of about 1,000, preferably in the range of about 2,000 to about 20,000 and the coating is converted into a tenaciously adhering, solvent-resistant, wear and weather-resistant coating by exposing the coated substrate to ionizing radiation, preferably in the form of an electron beam. This divinyl compound is formed by first reacting a monoepoxide with acrylic acid and/or methacrylic acid and subsequently reacting the resultant monovinyl ester condensation product with a vinyl unsaturated acyl halide.

---

This invention relates to the art of coating. It is particularly concerned with the process of painting a substrate having external surfaces of wood, glass, metal or polymeric solid with a film-forming solution comprising unique divinyl compounds and an alpha-beta olefinically unsaturated paint binder resin and crosslinking such film-forming solution into a wear-resistant, weather-resistant, solvent, resistant, tenaciously adhering film by exposing the same to ionizing radiation, preferably in the form of an electron beam, and to the paint used in this process.

In this application, the term "paint" is meant to include pigment and/or finely ground filler, the binder without pigment and/or filler or having very little of the same, which can be tinted if desired. Thus, the paint binder which is ultimately crosslinked by ionizing radiation can be all or virtually all that is used to form the film, where it can be a vehicle for pigment and/or particulate filler material.

Figure 1:
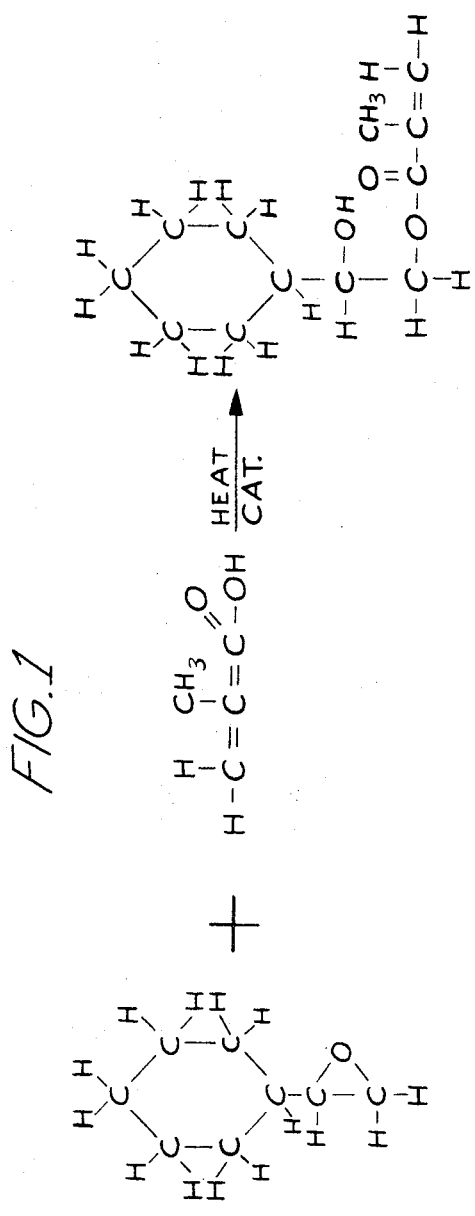
Figure 2:
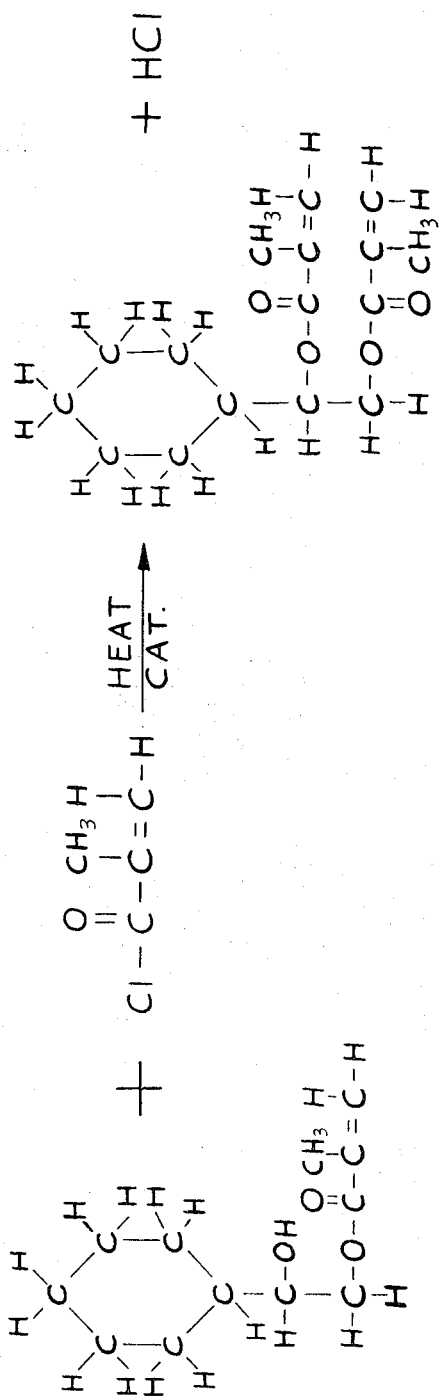

The first reaction step in preparing the divinyl compounds used herein is illustrated by the representative reaction shown in FIG. 1 of the accompanying drawing. The second reaction step is illustrated by the representative reaction shown in FIG. 2.

The monoepoxides employed as starting materials for preparing the divinyl compounds of this invention are $C_4$–$C_{12}$ monoepoxides. In the preferred embodiment the monoepoxide is a $C_7$–$C_{10}$ monocyclic monoepoxide in accordance with the formula

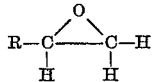

wherein R is an aryl, alkylaryl, arylalkyl, aryloxy, cycloaliphatic or heterocyclic radical, e.g., phenylglycidyl ether, vinyl cyclohexene epoxide, vinyl cyclopentene epoxide, styrene epoxide, vinyl toluene epoxide, vinyl pyridyl epoxide, etc. In this embodiment the monoepoxides have a molecular weight in the range of about 112 to about 151.

In another embodiment the monoepoxide is a $C_5$–$C_6$ monocyclic monoepoxide wherein the epoxide group is attached to carbon atoms of the cyclic structure, i.e., cyclohexene epoxide and cyclopentene epoxide. The monoepoxides of this group have molecular weights in the range of about 74 to about 98.

In a third embodiment the monoepoxide is a $C_4$–$C_{12}$ acyclic, aliphatic, alpha-beta monoepoxide, e.g., 1-butene epoxide, 1-hexene epoxide, 1-dodecene epoxide, etc.

The vinyl unsaturated acyl halides used are preferably acryloyl chloride and/or methacryloyl chloride but others may be used, e.g., the corresponding bromides.

The resultant divinyl compounds used herein are homopolymerizable and copolymerizable with monovinyl monomers, e.g., styrene, vinyl toluene, alpha-methyl styrene, methyl methacrylate, ethyl acrylate, butyl acrylate, butyl methacrylate, hydroxypropyl methacrylate, glycidyl methacrylate, 2-ethylhexyl acrylate, etc., divinyl monomers such as divinyl benzene, the divinyl reaction product formed by reacting a diepoxide having a molecular weight of below about 2,000, preferably in the range of about 140 to about 500, with two molar parts of acrylic acid or methacrylic acid and subsequently reacting the resultant ester condensation product with two molar parts of a saturated acyl halide, e.g., acetyl chloride, butyric acid chloride, hexanoic acid chloride, capric acid chloride, stearic acid chloride, or an effectively saturated acyl halide, e.g., benzoyl chloride, the divinyl reaction product formed by reacting one molar part of a diepoxide of the aforementioned molecular weight range with two molar parts of acrylic or methacrylic acid and subsequently reacting the resultant ester condensation product with two molar parts of an alpha-beta olefinically unsaturated acyl halide having an aromatic radical affixed to the beta carbon of the olefinic linkage, e.g., cinnamic acid chloride, the tetravinyl reaction product formed by reacting one molar part of a diepoxide of the aforementioned molecular weight range with two molar parts of acrylic or methacrylic acid and subsequently reacting the resultant ester condensation product with two molar parts of a vinyl unsaturated acyl halide, alpha-beta olefinically unsaturated polymer, etc.

The divinyl adducts use herein have lower viscosity than their corresponding monovinyl compounds produced by reacting one mole of a monoepoxide with acrylic or methacrylic acid. They also are more soluble in organic solvents and more sensitive to ionizing radiation.

The alpha-beta olefinically unsaturated paint binder resins have molecular weights in excess of about 1,000, preferably in the range of about 2,000 to about 20,000. They consist essentially of carbon, hydrogen and oxygen but they may be substituted, if desired, with non-interfering substituents, such as halogen atoms, nitrogen atoms and the like. They advisedly have their alpha-beta olefinic unsaturated concentration limited to about 0.5 to about 5, preferably about 0.7 to about 3, units per 1,000 units molecular weight. Preferably, they are either polyester or vinyl monmoer comprising copolymers. Suitable alpha-beta unsaturated resins are disclosed in U.S. Pats. 3,437,512; 3,437,513 and 3,437,514.

In accordance with this invention the paint binder composition exclusive of non-polymerizable solvents, pigments and particulate mineral filler, consists essentially of about 10 to about 80, preferably about 20 to about 60 parts, by weight of the divinyl compound and about 90 to about 20, preferably about 80 to about 40 parts by weight of the alpha-beta olefinically unsaturated resin.

It is within the scope of this invention to replace a minor portion, i.e., up to slightly below about 50 weight percent of divinyl compound and/or the alpha-beta olefinically unsaturated resins with monovinyl monomers and/or a different divinyl compound consisting of carbon, hydrogen and oxygen and having a molecular weight below about 2,600, preferably about 220 to about 1,100, more preferably between 220 and about 650, and/or a tetravinyl compound consisting essentially of carbon, hydrogen and oxygen and having a molecular weight below about 2,600, preferably between about 220 and about 1,100, more preferably between about 220 and about 650.

The divinyl compounds and tetravinyl compounds are derived from diepoxides hereinbefore and hereinafter mentioned are suitable for such purposes.

The films formed from the paint of this invention are advantageously cured at relatively low temperatures, e.g., between about 20° to about 70° C. The radiation energy is applied at dose rates of about 0.1 to about 100 Mrad per second upon a preferably moving workpiece until the wet film is converted to tack-free state or until the film is exposed to a desired voltage.

The film-forming material advisedly has an application viscosity low enough to permit rapid application to the substrate in substantially even depth and high enough so that at least one mil (0.001 inch) film will hold upon a vertical surface without sagging. Such films will ordinarily be applied to an average depth of about 0.1 to about 4 mils with appropriate adjustment in viscosity and application technique. It will be obvious to those skilled in the art that the choice of divinyl and other polymerizable compounds of the paint binder composition can be varied so as to vary the viscosity of the resultant film-forming material. Likewise, the viscosity of the film-forming composition can be adjusted by the addition of non-polymerizable, volatile solvents, e.g., toluene, xylene, acetone, etc., which can be flashed off after application. By one or more such adjustments, the viscosity of the paint binder solution can be adapted for application by conventional paint application techniques, e.g., spraying, roll coating, etc. Paint binder is preferably applied to the substrate and cured thereon as a continuous film of substantially even depth.

This invention will be more fully understood from the following illustrative examples:

EXAMPLE 1

A divinyl compound is prepared in a manner below set forth from the materials hereinafter named:

(1) To a reaction vessel equipped with a condenser stirrer, nitrogen inlet and thermometer are charged the following materials.

Materials: Parts by weight
   (a) Vinylcyclohexene epoxide _____ 126
   (b) Methacrylic acid _____ 85
   (c) Toluene (solvent) _____ 500
   (d) Dimethylbenzylamine (catalyst) _____ 2

(2) The vinylcyclohexene epoxide, the methacrylic acid and the dimethylbenzylamine are intimately mixed and incrementally added to the toluene which is at 90° C. in a nitrogen atmosphere.

(3) The reaction mixture is maintained at 90° C. until reaction of the epoxide groups is essentially complete as measured by product acid number of less than about 10.

(4) The solvent is removed under vacuum.

(5) The reaction product of (4) in the amount of 210 parts by weight is dissolved in 500 parts by weight of toluene and 95 parts by weight of methacryloyl chloride are added dropwise with the reaction mixture maintained at 65° C. until HCl evolution ceases.

(6) The solvent is removed under vacuum and the divinyl compound is recovered.

An alpha-beta olefinically unsaturated vinyl resin, Resin A, is prepared in the following manner:

Starting materials: Parts by weight
   Xylene _____ 600
   Methyl methacrylate _____ 196
   Ethyl acrylate _____ 333
   Glycidyl methacrylate _____ 71
   Azobisiso butyronitrile _____ 6
   Hydroquinone _____ 0.12
   Methacrylic acid _____ 42
   Triethylamine _____ 0.96

Procedure

The solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers, excepting the methacrylic acid and initiator (azobisiso butyronitrile) is added to the refluxing solution evenly over 2 hours. The initiator weight is 10 parts by weight per 1,000 parts by weight of vinyl monomers. The reaction solution is refluxed until the conversion of monomers to polymers is greater than about 97 percent. In the second step, hydroquinone is added as an inhibitor and then the methacrylic acid is added to react with the epoxy groups on the polymer. Triethylamine is used as a catalyst. This esterification reaction is carried out at reflux temperatures until about 80 percent esterification is accomplished (determined by residual acid number). The xylene is then removed by vacuum distillation and the polymer recovered.

Substrates of wood, glass, metal and polymeric solid, i.e., polypropylene and acrylonitrile-butadiene-styrene, copolymer, are coated with a paint binder consisting essentially of this divinyl compound and Resin A using the following procedure:

(1) Twenty (20) parts by weight of the tetravinyl compound is mixed with 80 parts by weight of Resin A and diluted to spraying viscosity with acetone. This solution is sprayed upon the aforementioned substrates to an average depth of about 1 mil (0.001 inch) and the solvent flashed off. The coated substrate is passed through a nitrogen atmosphere and at a distance of about 10 inches below the electron emission window of a cathode ray type, electron accelerator through which an electron beam is projected upon the coated surface until the wet coating is polymerized to a tack-free state. The electrons of this beam have an average energy of about 275,000 electron volts with a current of about 25 milliamperes.

(2) A second group of substrates are coated in the manner above set forth using the same conditions and materials except for the single difference that the paint binder solution used consists of 60 parts by weight of the divinyl compound, 40 parts by weight of Resin A, and said acetone and the coating is applied to a depth of about 3 mils.

(3) A third group of substrates are coated in the manner above set forth using the same conditions and materials except for the single difference that the paint binder solution used consists of 10 parts by weight of the divinyl compound, 90 parts by weight of Resin A, and said acetone.

(4) A fourth group of substrates are coated in the manner above set forth using the same conditions and materials except for the single difference that the paint binder solution used consists of 80 parts by weight of the divinyl compound, 20 parts by weight of Resin A, and said acetone.

EXAMPLE 2

The procedure of Example 1 is repeated with the following difference: (a) Resin A is replaced with a polyester resin, Resin B hereinafter described, (2) the irradiation atmosphere is helium, and (3) the electron beam used has an average energy of about 350,000 electron volts.

Preparation of Resin B

Starting materials: Parts by weight
   Maleic anhydride _____ 14.7
   Tetrahydrophthalic anhydride _____ 72.3
   Neopentyl glycol _____ 75.0
   Dibutyl tin oxide, catalyst _____ 7.06

Procedure

To a reaction vessel, the reactants are charged and heated to about 340° F. and held at this temperature for 1 hour. The temperature of the charge is then raised to 440° F. and maintained at such temperature until the acid number of the resultant resin is below about 20. The excess glycol and water are removed by vacuum and when the acid number is below about 10, there are added 0.03 part by weight hydroquinone.

EXAMPLE 3

The procedure of Example 2 is repeated with the sole difference that Resin B is replaced with an equal amount by weight of Resin C, a polyester prepared by the procedure used to prepare Resin B except that an equimolar amount of phthalic anhydride is substituted for the tetrahydrophthalic anhydride.

EXAMPLE 4

The procedure of Example 2 is repeated with the sole difference that Resin B is replaced with an equal amount by weight of Resin D, a polyester prepared by the procedure used to prepare Resin B except that an equimolar amount of ethyleneglycol is substituted for the neopentyl glycol.

EXAMPLE 5

The procedure of Example 2 is repeated with the sole difference that Resin B is replaced with an equal amount by weight of Resin E, a polyester prepared by the procedure used to prepare Resin B except that an equimolar amount of trimellitic anhydride is substituted for the tetrahydrophthalic anhydride.

EXAMPLE 6

The procedure of Example 2 is repeated with the sole difference that Resin B is replaced with an equal amount by weight of Resin F, a polyester prepared by the procedure used to prepare Resin R except that an equimolar amount of pentaerythritol is substituted for the neopentyl glycol.

EXAMPLE 7

The procedure of Example 2 is repeated with the sole difference that Resin B is replaced with an equal amount by weight of Resin G, a polyester prepared by the procedure used to prepare Resin B except that an equimolar amount of 1,6-hexamethylene glycol is substituted for the neopentyl glycol.

EXAMPLE 8

The procedure of Example 2 is repeated with the sole difference that Resin B is replaced with an equal amount by weight of Resin H, a polyester prepared by the procedure used to prepare Resin B except that an equimolar amount of fumaric acid is substituted for the maleic anhydride.

EXAMPLE 9

The procedure of Example 2 is repeated with the sole difference that Resin B is replaced with an equal amount by weight of Resin I, a polyester prepared by the procedure used to prepare Resin B except that an equimolar amount of 2-butene-1,4-diol is substituted for neopentyl glycol.

EXAMPLE 10

The procedures of Examples 1 and 2 are repeated in those embodiments wherein a non-polymerizable solvent is employed with the sole difference that the acetone is replaced by toluene.

EXAMPLE 11

The procedure of Example 1 is repeated with the sole difference that Resin A is replaced with a different vinyl monomer comprising resin, Resin J.

Preparation of Resin J

| Starting materials: | Parts by weight |
|---|---|
| Methyl methacrylate | 400 |
| Ethyl acrylate | 400 |
| Hydroxyethyl methacrylate | 195 |
| Toluene | 1000 |
| Benzoyl peroxide | 30 |

Procedure

Step I.—The benzoyl peroxide is dissolved in a solution of methyl methacrylate, ethyl acrylate and hydroxyethyl methacrylate and one-half of the toluene. This solution is added incrementally to the remainder of the toluene at reflux over a 7 hour period with a final part temperature of about 138°–140° C. Reflux is maintained for another 3 hours and the solution cooled.

Step II.

| Materials: | Parts by weight |
|---|---|
| Solution from Step I | 500 |
| Acryloyl chloride | 33.8 |
| Toluene | 30 |

The solution of Step I is heated to 60° C. in a solution of the acryloyl chloride and toluene is added dropwise over a 4 hour period while the temperature is allowed to rise to about 90° C. After heating for another 2.5 hours the polymer is recovered by vacuum distillation.

EXAMPLE 12

The procedure of Example 1 is repeated with the sole difference that Resin A is replaced with a different vinyl monomer comprising resin, Resin K.

Preparation of Resin K

| Materials: | Parts by weight |
|---|---|
| Ethyl acrylate | 39 |
| Methyl methacrylate | 24 |
| Allyl alcohol | 36 |
| Benzoyl peroxide | 1 |
| Xylene | Solvents |

Procedure

Step I.—To a reaction vessel provided with a condenser, thermometer, agitator and dropping funnel there are charged an amount of xylene equal in weight to the reactants to be added to the first reaction step. The xylene is heated to about 100°–120° C. The four reacting materials are thoroughly mixed and added slowly with a dropping funnel to the heated xylene over a period of 4 hours. The reaction is held at this temperature for 1–2 hours after addition is complete and then cooled to room temperature.

A second step reaction is carried out with the following materials.

Step II.

| Materials: | Parts by weight |
|---|---|
| Copolymer of Step I, in xylene | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of about 100°–120° C. This temperature is maintained for about 7 hours. The polymeric reaction product is separated from the xylene by vacuum distillation.

EXAMPLE 13

The procedures of Examples 1 and 2 are repeated except that the monoepoxide employed is phenyl glycidyl ether.

EXAMPLE 14

The procedures of Examples 1 and 2 are repeated except that the monoepoxide employed is vinyl cyclopentene epoxide.

EXAMPLE 15

The procedures of Examples 1 and 2 are repeated except that the monoepoxide is styrene epoxide.

EXAMPLE 16

The procedures of Examples 1 and 2 are repeated except that the monoepoxide employed is vinyl toluene epoxide.

EXAMPLE 17

The procedures of Examples 1 and 2 are repeated except that the monoepoxide employed is vinyl pyridyl epoxide.

EXAMPLE 18

The procedures of Examples 1 and 2 are repeated except that the monoepoxide employed is cyclohexene epoxide.

EXAMPLE 19

The procedures of Examples 1 and 2 are repeated except that the monoepoxide employed is cyclopentene epoxide.

EXAMPLE 20

The procedures of Examples 1 and 2 are repeated except that the monoepoxide employed is 1 butene epoxide.

EXAMPLE 21

The procedures of Examples 1 and 2 are repeated except that the monoepoxide employed is 1 hexene epoxide.

EXAMPLE 22

The procedures of Examples 1 and 2 are repeated except that the monoepoxide employed is 1-dodecene epoxide.

EXAMPLE 23

The procedure of Example 1 is repeated with the sole difference that methacryloyl bromide is used in lieu of the methacryloyl chloride.

EXAMPLE 24

The procedure of Example 1 is repeated with the sole difference that acryloyl chloride is substituted for the methacryloyl chloride.

EXAMPLE 25

The procedure of Example 1 is repeated with the sole difference that acryloyl bromide is substituted for the methacryloyl chloride.

EXAMPLE 26

The procedure of Example 1 is repeated with the sole difference that the monoepoxide is first reacted with acrylic acid instead of the methacrylic acid.

EXAMPLE 27

The procedure of Example 1 is repeated with the sole difference that in separate operations minor portions of the divinyl compound and minor portions of Resin A are replaced with equal amounts by weight of monovinyl monomers and substrates are coated as in Example 1 with the following differences: The first group of substrates are coated as in Example 1 with the sole difference being that in the paint binder composition 49 weight percent of the divinyl compound is replaced with an equal amount by weight of monovinyl monomers, i.e., an equimolar mixture of methyl methacrylate, ethyl acrylate, butyl acrylate, and 2-ethyl hexyl acrylate.

Additional substrates are coated in like manner except that in the paint binder solution 1 weight percent of the divinyl compound is replaced with an equal amount by weight of monovinyl monomers, i.e., methyl methacrylate and styrene in an equimolar mixture.

Additional substrates are coated in like manner except that in the paint binder solution 25 weight percent of the divinyl compound is replaced with an equal amount by weight of monovinyl monomers, i.e., an equimolar mixture of methyl methacrylate, ethyl acrylate, butyl acrylate and styrene.

Additional substrates are coated in like manner except that in the paint binder solution 1 weight percent of Resin A is replaced with an equal amount by weight of styrene.

Additional substrates are coated in like manner except that in the paint binder solution 25 weight percent of Resin A is replaced with an equal amount by weight of methyl methacrylate.

Additional substrates are coated in like manner except that in the paint binder solution 49 weight percent of Resin A is replaced with an equal amount by weight of monovinyl monomers, i.e., an equimolar mix of styrene and methyl methacrylate.

EXAMPLE 28

A divinyl compound is prepared as in Example 1 and a tetravinyl compound is prepared using the same procedure by reacting 3,4-epoxy-6-methyl-cyclohexylmethyl-3,4-epoxy-methylcyclohexenecarboxylate with 2 molar equivalents of methacrylic acid and then reacting the resultant divinyl ester condensation product with 2 molar equivalents of methacryloyl chloride.

Substrates are then coated as in Example 1 with the sole difference that in the paint binder solution 49 weight percent of the divinyl compound is replaced with an equal amount by weight of the tetravinyl compound.

Additional substrates are coated in like manner except that in the paint binder solution 1 weight percent of the divinyl compound is replaced with an equal amount by weight of the tetravinyl compound.

Additional substrates are coated in like manner except that in the paint binder solution 25 weight percent of the divinyl compound is replaced with an equal amount by weight of the tetravinyl compound.

Additional substrates are coated in like manner except that in the paint binder solution 1 weight percent of Resin A is replaced with an equal amount by weight of said tetravinyl compound.

Additional substrates are coated in like manner except that in the paint biner solution 25 weight percent of Resin A is replaced with an equal amount by weight of said tetravinyl compound.

Additional substrates are coated in like manner except that in the paint binder solution 49 weight percent of Resin A is replaced with an equal amount by weight of said tetravinyl compound.

EXAMPLE 29

A divinyl compound is prepared as in Example 1 and a different divinyl compound is prepared using the same procedure by reacting one molar part of a diepoxide, i.e., 1-epoxyethyl-3,4-epoxycyclohexane, with 2 molar equivalents of methacrylic acid and then reacting the resultant divinyl ester condensation product with 2 molar equivalents of butyric acid chloride. Substrates are then coated as in Example 1 with the sole difference that in the paint binder solution 49 weight percent of the divinyl compound prepared from the monoepoxide is replaced with an equal amount by weight of the divinyl compound prepared from the diepoxide.

Additional substrates are coated in like manner except that in the paint binder solution 1 weight percent of the divinyl compound prepared from the monoepoxide is replaced with an equal amount by weight of the divinyl compound prepared from the dioxide.

Additional substrates are coated in like manner except that in the paint binder solution 25 weight percent of the divinyl compound prepared from the monoepoxide is replaced with an equal amount by weight of the divinyl compound prepared from the diepoxide.

Additional substrates are coated in like manner except that in the paint binder solution 1 weight percent of the Resin A is replaced with an equal amount by weight of the divinyl compound prepared from the diepoxide.

Additional substrates are coated in like manner except that in the paint binder solution 25 weight percent of Resin A is replaced with an equal amount by weight of the divinyl compound prepared from the diepoxide.

Additional substrates are coated in like manner except that in the paint binder solution 49 weight percent of Resin A is replaced with an equal amount by weight of the divinyl compound prepared from the diepoxide.

EXAMPLE 30

A divinyl compound is prepared as in Example 1 and a different divinyl compound is prepared using the same procedure by reacting a diepoxide, dicyclopentadienedioxide with two molar equivalents of acrylic acid and then reacting the resultant divinyl ester condensation product with two molar equivalents of cinnamic acid chloride. Substrates are then coated as in Example 1 with the sole difference that in the paint binder solution 49 weight percent of the divinyl compound prepared from the monoepoxide is replaced with an equal amount by weight of the divinyl compound prepared from the diepoxide.

Additional substrates are coated in like manner except that in the paint binder solution 1 weight percent of the divinyl compound prepared from the monoepoxide is replaced with an equal amount by weight of the divinyl compound prepared from the diepoxide.

Additional substrates are coated in like manner except that in the paint binder solution 25 weight percent of the divinyl compound prepared from the monoepoxide is replaced with an equal amount by weight of the divinyl compound prepared from the diepoxide.

Additional substrates are coated in like manner except that in the paint binder solution 1 weight percent of Resin A is replaced with an equal amount by weight of the divinyl compound prepared from the diepoxide.

Additional substrates are coated in like manner except that in the paint binder solution 25 weight percent of Resin A is replaced with an equal amount by weight of the divinyl compound prepared from the diepoxide.

Additional substrates are coated in like manner except that in the paint binder solution 49 weight percent of Resin A is replaced with an equal amount by weight of the divinyl compound prepared from the diepoxide.

EXAMPLE 31

The procedure of Example 30 is repeated except for the sole difference that benzoyl chloride is substituted for the cinnamic acid chloride in preparing the divinyl compound from the diepoxide.

EXAMPLE 32

The procedure of Example 31 is repeated except for the sole difference that stearic acid chloride is substituted for the cinnamic acid chloride used in preparing the divinyl compound from the diepoxide.

EXAMPLE 33

The procedure of Example 31 is repeated except for the sole difference that hexanoic acid chloride is substituted for the cinnamic acid chloride used in preparing the divinyl compound from the diepoxide.

EXAMPLE 34

The procedures of Examples 27 through 33 are repeated except that the polyester resin, Resin B is substituted for the vinyl resin, Resin A.

EXAMPLE 35

The procedure of Example 1 is repeated except that 25 weight percent of the divinyl compound prepared from the monoepoxide and 25 weight percent of Resin A are replaced with an equal amount by weight of an aquimolar mixture of styrene and methyl methacrylate.

EXAMPLE 36

The procedure of Example 2 is repeated except that 25 weight percent of the divinyl compound prepared from the monoepoxide and 25 weight percent of Resin B are replaced with an equal amount by weight of an equimolar mixture of styrene and methyl methacrylate.

The term "ionizing radiation" as employed herein means radiation having sufficient energy to effect polymerization of the paint film herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece when the intervening space is occupied by air. Adjustment can be made for the relative resistance of the intervening gas which is preferably an oxygen-free inert gas such as nitrogen or helium.

The abbreviation "rad" as employed herein means that dose of radiation which results in the absorption of 100 ergs of energy per gram of absorber, e.g. coating film. The abbreviation "Mrad" as employed herein means 1 million rad. The electron emitting means may be a linear electron accelerator capable of producing a direct current potential in the range of about 100,000 to about 500,000 volts. In such a device electrons are ordinarily emitted from a hot filament and accelerated through a uniform voltage gradient. The electron beam, which may be about ⅛ inch in diameter at this point, may then be scanned to make a fan-shaped beam and then passed through a metal window, e.g., a magnesium-thorium alloy, aluminum, an alloy of aluminum and a minor amount of copper, etc., of about 0.003 inch thickness.

It will be understood by those skilled in the art that modifications can be made within the foregoing examples without departing from the spirit and scope of the invention as set forth in the following claims.

What is claimed is:

1. A paint polymerizable by ionizing radiation which, exclusive of non-polymerizable solvents, pigments and particulate mineral filler, consists essentially of a film-forming solution of about 20 to about 90 parts by weight of an alpha-beta olefinically unsaturated resin having molecular weight in excess of about 1,000 and about 80 to about 10 parts by weight of a divinyl compound formed by first reacting one molar part of a monoepoxide with one molar part of an alpha-beta olefinically unsaturated monocarboxylic acid selected from acrylic acid and methacrylic acid and subsequently reacting the resultant monovinyl ester condensation product with one molar part of a vinyl unsaturated acyl halide.

2. A paint in accordance with claim 1 wherein said monoepoxide is a $C_7$–$C_{10}$ monocyclic monoepoxide in accordance with the formula

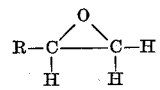

wherein R is an aryl, alkyl aryl, araylalkyl, aryloxy, cycloaliphatic or heterocyclic radical.

3. A paint in accordance with claim 1 wherein said monoepoxide is a monoepoxide selected from the group consisting of cyclohexene epoxide and cyclopentene epoxide.

4. A paint in accordance with claim 1 wherein said monoepoxide is $C_4$–$C_{12}$ acyclic, aliphatic, alpha-beta monoepoxide.

5. A paint in accordance with claim 1 wherein said alpha-beta olefinically unsaturated resin contains about 0.5 to about 5 units of alpha-beta olefinically unsaturation per 1,000 units molecular weight and has a molecular weight in the range of about 2,000 to about 20,000.

6. A paint in accordance with claim 1 wherein said alpha-beta olefinically unsaturated resin contains about 0.7 to about 3 units of alpha-beta olefinically unsaturation per 1,000 units molecular weight and has a molecular weight in the range of about 2,000 to about 20,000 and said monoepoxide is a $C_7$–$C_{10}$ monocyclic monoepoxide in accordance with the formula

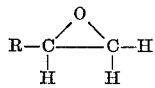

wherein R is an aryl, alkyl aryl, arylalkyl, aryloxy, cycloaliphatic or heterocyclic radical.

7. A paint in accordance with claim 1 wherein said acyl halide is the chloride of acrylic or methacrylic acid.

8. A paint in accordance with claim 1 wherein said acyl halide is the bromide of acrylic or methacrylic acid.

9. A paint in accordance with claim 1 wherein an amount up to but less than 50% of said alpha-beta olefinically unsaturated resin is replaced with an equal amount by weight of a monovinyl monomer.

10. A paint in accordance with claim 1 wherein an amount up to but less than 50% of said divinyl compound is replaced with an equal amount by weight of a monovinyl monomer.

11. A paint in accordance with claim 1 wherein an amount up to but less than 50% of said alpha-beta olefinically unsaturated resin is replaced with an equal amount by weight of a tetravinyl compound consisting essentially of carbon, hydrogen and oxygen and having a molecular weight below about 2,600.

12. A paint in accordance with claim 1 wherein an amount up to but less than 50% of said alpha-beta olefinically unsaturated resin is replaced with an equal amount by weight of a tetravinyl compound consisting essentially of carbon, hydrogen and oxygen and having a molecular weight in the range of about 220 to about 1100.

13. A paint in accordance with claim 1 wherein an amount up to but less than 50% of said alpha-beta olefinically unsaturated resin is replaced with an equal amount by weight of a tetravinyl compound consisting essentially of carbon, hydrogen and oxygen and having a molecular weight in the range of about 220 to about 650.

14. A paint in accordance with claim 1 wherein an amount up to but less than 50% of said divinyl compound is replaced with an equal amount by weight of a tetravinyl compound consisting essentially of carbon, hydrogen and oxygen and having a molecular weight below about 2,600.

15. A paint in accordance with claim 1 wherein an amount up to but less than 50% of said divinyl compound is replaced with an equal amount by weight of a tetravinyl compound consisting essentially of carbon, hydrogen and oxygen and having a molecular weight in the range of about 220 to about 1100.

16. A paint in accordance with claim 1 wherein an amount up to but less than 50% of said divinyl compound is replaced with an equal amount by weight of a tetravinyl compound consisting essentially of carbon, hydrogen and oxygen and having a molecular weight in the range of about 220 to about 650.

17. A paint in accordance with claim 1 wherein an amount up to but less than 50% of said alpha-beta olefinically unsaturated resin is replaced with an equal amount by weight of a divinyl compound having a molecular weight below about 2,600 and formed by reacting a diepoxide with two molar equivalents of an alpha-beta olefinically unsaturated monocarboxylic acid selected from acrylic acid and methacrylic acid and subsequently reacting the resultant divinyl ester condensation product with two molar parts of a saturated acyl halide.

18. A paint in accordance with claim 1 wherein an amount up to but less than 50% of said alpha-beta olefinically unsaturated resin is replaced with an equal amount by weight of a divinyl compound having a molecular weight in the range of about 220 to about 1100 and formed by reacting a diepoxide with two molar equivalents of an alpha-beta olefinically unsaturated monocarboxylic acid selected from acrylic acid and methacrylic acid and subsequently reacting the resultant divinyl ester condensation product with two molar parts of a saturated acyl halide.

19. A paint in accordance with claim 1 wherein an amount up to but less than 50% of said divinyl compound is replaced with an equal amount by weight of a divinyl compound having a molecular weight below about 2,600 and formed by reacting a diepoxide with two molar equivalents of an alpha-beta olefinically unsaturated monocarboxylic acid selected from acrylic acid and methacrylic acid and subsequently reacting the resultant divinyl ester condensation product with two molar equivalents of a saturated acyl halide.

20. A paint in accordance with claim 1 wherein an amount up to but less than 50% of said divinyl compound is replaced with an equal amount by weight of a divinyl compound having a molecular weight in the range of about 220 to about 100 and formed by reacting a diepoxide with two molar equivalents of an alpha-beta-olefinically unsaturated monocarboxylic acid selected from acrylic acid and methacrylic acid and then reacting the resultant divinyl ester condensation product with two molar equivalents of a saturated acyl halide.

21. A paint polymerizable by ionizing radiation which, exclusive of non-polymerizable solvents, pigments and particulate mineral filler, consists essentially of a film-forming solution of about 40 to about 80 parts by weight of an alpha-beta olefinically unsaturated resin having a molecular weight in the range of about 1,000 to about 20,000 and about 60 to about 20 parts by weight of a divinyl compound formed by first reacting a monoepoxide having a molecular weight in the range of about 72 to about 151 with an alpha-beta olefinically unsaturated monocarboxylic acid selected from acrylic acid and methacrylic acid and subsequently reacting the resultant monovinyl ester condensation product with a vinyl unsaturated acyl halide.

22. A paint in accordance with claim 21 wherein a minor amount of alpha-beta olefinically unsaturated resin is replaced with an equal amount by weight of monovinyl monomer.

23. A paint in accordance with claim 21 wherein a minor amount of said divinyl compound is replaced with an equal amount by weight of monovinyl monomer.

24. A paint in accordance with claim 21 wherein amounts up to but less than 50% of said alpha-beta olefinically unsaturated resin and an amount up to but less than 50% of said divinyl compound are replaced with equal amounts by weight of a monovinyl monomer.

25. A paint in accordance with claim 21 wherein a minor amount of said divinyl compound is replaced with an equal amount by weight of a tetravinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a vinyl unsaturated acyl halide.

26. A paint in accordance with claim 21 wherein a minor amount of said alpha-beta olefinically unsaturated resin is replaced with an equal amount by weight of a tetravinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a vinyl unsaturated acyl halide.

27. A paint in accordance with claim 21 wherein a minor amount of divinyl compound is replaced with an equal amount by weight of a divinyl compound having molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

28. A paint in accordance with claim 21 wherein a minor amount of said divinyl compound is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

29. A paint in accordance with claim 21 wherein a minor amount of said divinyl compound is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an alpha-beta olefinically unsaturated acyl halide having an aromatic radical affixed to the beta carbon of the olefinic linkage.

30. A paint in accordance with claim 21 wherein a minor amount of said alpha-beta olefinically unsaturated resin is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of alpha-beta olefinically unsaturated acyl halide having an aromatic radical affixed to the beta carbon of the olefinic linkage.

31. A method for painting a substrate wherein a film-forming solution is applied as a paint film to a surface of said substrate and crosslinked thereon by exposing a coated surface to ionizing radiation, the improvement wherein said film-forming solution, exclusive of non-polymerizable solvents, pigments and particulate mineral filler, consists essentially of a film-forming solution of about 20 to about 90 parts by weight of an alpha-beta olefinically unsaturated resin having molecular weight in excess of about 1,000 and about 80 to about 10 parts by weight of a divinyl compound formed by first reacting one molar part of an alpha-beta olefinically unsaturated monocarboxylic acid selected from acrylic acid and methacrylic acid and subsequently reacting the resultant monovinyl ester condensation product with one molar part of a vinyl unsaturated acyl halide.

32. An article of manufacture comprising in combination a substrate and a polymerized coating of paint formed upon an external surface thereof by applying to said surface a film of substantially even depth of a film-forming solution which, exclusive of nonpolymerizable solvents, pigments and particulate mineral filler, consists essentially of about 20 to about 90 parts by weight of an alpha-beta olefinically unsaturated resin having molecular weight in the range of about 1,000 to about 20,000 and about 80 to about 10 parts by weight of a divinyl compound formed by first reacting one molar part of a monoepoxide with one molar part of an alpha-beta olefinically unsaturated monocarboxylic acid selected from acrylic acid and methacrylic acid and subsequently reacting the resultant monovinyl ester condensation product with one molar part of a vinyl unsaturated acyl halide, and crosslinking said film upon said surface with ionizing radiation.

References Cited

UNITED STATES PATENTS 3,466,259  9/1969  Jernigan _____ 260—836X

FOREIGN PATENTS 1,006,587  10/1965  Great Britain _____ 260—486

ALFRED L. LEAVITT, Primary Examiner

J. H. NEWSOME, Assistant Examiner

U.S. Cl. X.R.

117—138.8, 161; 204—159.15, 159.16; 260—410.6, 475, 485, 486, 835, 836, 857